United States Patent [19]

Horsthuis

[11] Patent Number: 5,283,685
[45] Date of Patent: Feb. 1, 1994

[54] METHOD OF MANUFACTURING AN NLO-ACTIVE DEVICE

[75] Inventor: Winfried H. G. Horsthuis, Enschede, Netherlands

[73] Assignee: Akzo NV, Arnhem, Netherlands

[21] Appl. No.: 990,871

[22] Filed: Dec. 15, 1992

[30] Foreign Application Priority Data

Dec. 23, 1991 [NL] Netherlands ................. 9102167

[51] Int. Cl.$^5$ .............................................. G02F 1/35
[52] U.S. Cl. ............................... 359/332; 359/326; 385/2; 385/122; 385/141
[58] Field of Search ................. 359/326–332; 372/20–22; 385/1–3, 122, 123, 129, 141, 143, 145

[56] References Cited

U.S. PATENT DOCUMENTS

| | | | |
|---|---|---|---|
| 4,767,169 | 8/1988 | Teng et al. | 385/2 |
| 4,865,406 | 9/1989 | Khanarian et al. | 350/96.12 |
| 4,887,884 | 12/1989 | Hayden | 385/141 X |
| 4,971,416 | 11/1990 | Khanarian et al. | 350/96.12 |
| 5,058,970 | 10/1991 | Schildkraut et al. | 359/328 |
| 5,076,658 | 12/1991 | Hayden et al. | 385/122 X |
| 5,106,936 | 4/1992 | Gulotty et al. | 372/21 X |

FOREIGN PATENT DOCUMENTS

| | | | |
|---|---|---|---|
| 254921 | 2/1988 | European Pat. Off. | G02F 1/37 |
| 350112 | 1/1990 | European Pat. Off. | C08G 18/67 |
| 350113 | 1/1990 | European Pat. Off. | C08G 63/68 |
| 355915 | 2/1990 | European Pat. Off. | G02F 1/37 |
| 358476 | 3/1990 | European Pat. Off. | G03F 7/00 |
| 359648 | 3/1990 | European Pat. Off. | C08G 18/38 |
| 361602 | 4/1990 | European Pat. Off. | H01L 33/00 |
| 378185 | 7/1990 | European Pat. Off. | C08F 20/36 |
| 396172 | 11/1990 | European Pat. Off. | C08F 220/34 |
| 445864 | 9/1991 | European Pat. Off. | C08G 18/00 |
| 2187566 | 9/1987 | United Kingdom | G02F 1/37 |

OTHER PUBLICATIONS

M. S. Pereira et al., "Frequency Accommodation and Synchronization in Digital TV Codec", Electronic Letters (Dec. 6, 1990) vol. 26, No. 25, pp. 2104–2105.

W. H. G. Horsthuis et al., "Simple Measuring Method for Electro-Optic Coefficients in Poled Polymer Waveguides", Appl. Phys. Lett. 55(7), Aug. 14, 1989, pp. 616–618.

P. R. Ashley et al., "New Poling Techniques for Electro-Optic Polymer Devices", Integrated Photonics Research 1991, p. 87.

D. J. Williams, "Organic Polymeric and Non-Polymeric Materials With Large Optical Nonlinearities", Angew Chem. Int. Ed. Engl. 23 (1984), 690–703.

*Primary Examiner*—John D. Lee
*Attorney, Agent, or Firm*—Richard P. Fennelly; Louis A. Morris

[57] ABSTRACT

Manufactured is a non-linear optically active (NLO) device, an optical waveguiding structure being formed which comprises at least a layer of an NLO polymer containing hyperpolarizable groups, and the NLO polymer being exposed, with heating, to an electric field for poling of the hyperpolarizable groups, the heating being by contacting the NLO polymer with a thermal energy generating live electric conductor (a resistor wire). Preferably, the live electric conductor also functions as electrode when generating the electric field with which the hyperpolarizable groups are poled. The invention further relates to a device comprising an optical waveguiding structure and electrodes for electro-optically affecting light coupled into the waveguide. The live electric conductor used in the manufacture also functions as an electro-optical effect generating electrode.

13 Claims, No Drawings

METHOD OF MANUFACTURING AN NLO-ACTIVE DEVICE

The invention relates to a method of manufacturing a non-linear optically active (NLO) device, in which process an optical waveguiding structure is formed which comprises at least a layer of an NLO polymer containing hyperpolarizable groups, with the NLO polymer being exposed, with heating, to an electric field for poling of the hyperpolarizable groups.

Devices comprising waveguiding NLO materials are known. Examples that come to mind include an electro-optical switch or an electro-optical Mach-Zehnder interferometer.

In optically non-linear materials, also called non-linear optical (NLO) materials, non-linear polarization occurs under the influence of an external field of force (such as an electric field). Non-linear electric polarization may give rise to a number of optically non-linear phenomena, such as frequency doubling, Pockels effect, and Kerr effect. Alternatively, NLO effects can be generated, say, opto-optically or acoustic-optically.

In order to render polymeric NLO materials NLO-active (to obtain the desired NLO effect macroscopically), the groups present in such a material, usually hyperpolarizable side groups, first have to be aligned (poled). Such alignment is commonly effected by exposing the polymeric material to electric (d.c. voltage, the so-called poling field, with such heating as will render the polymeric chains sufficiently mobile for orientation.

Within the scope of the present invention, the term "NLO polymer" always refers to thermoplastic, generally amorphous polymers as well as to thermosets. Suitable oligomers, prepolymers, and other organic NLO materials from which a polable layer can be formed are also embraced by the term "NLO polymer" according to the invention. In the case of NLO thermosets, an NLO polymer is formed by curing and rendered NLO-active by simultaneous alignment.

For example, a method as described in the opening paragraph is known, for an NLO thermoset, from European Patent Publication No. 445,864. In this case, a layer of the polymeric NLO material is formed by first applying the NLO composition to be cured to a substrate and then heating the whole with simultaneous exposure to an electric field. Heating can be effected by placing the substrate on a hot base (a controlled temperature table).

While such a heating method is highly satisfactory for research purposes, it is not very practical for application on a commercial scale. For instance, the opportunities for automation of the method developed on a bench scale leave much to be desired. Also, a faster method is advisable.

The present invention remedies this situation by means of a method of the above-mentioned known type, in which the NLO polymer is contacted with a thermal energy-generating live electric conductor in order to be heated. Such a heating element can be generally indicated by the known term "resistor wire". Of course, suitable thermal energy generating conductors are not restricted to the wire form.

It is pertinent to note that the heating of NLO materials using a resistor wire is disclosed by European Patent Publication No. 318,087, where such a heating method is described for poling and unpoling the working area of a device for the controlled supply of a beam of light (an optical switch). The resistor wire in that case was used in an electro-optical device. The present invention, according to which the resistor wire has a function in the making of an NLO device, is significantly different. In general, it is not to be expected that a method employed in the application of a particular device can be utilized advantageously for manufacturing a device which is different from the first device. According to the invention, an NLO-active device is made comprising NLO material into which a permanent dipole has been incorporated (poled NLO material). The action of such a device is based on the occurrence of the aforementioned non-linear polarization in the permanently poled material. European Patent Publication No. 318,087 relates to devices of which the action is based on changing the alignment.

It is precisely in the manufacture of the device that the use of the known heating method in the process according to the invention has advantages which cannot be derived from European Patent Publication No. 318,087 over the above-indicated known method. Because the method according to the invention is faster, it is possible to apply higher field intensities during the alignment, giving an increased degree of poling. Since this degree of poling is what determines the ultimate functioning of the device, this is of vital importance in the manufacture of NLO-active devices. Also, it is an advantage in the present, faster manufacturing process that the risk of injection and trapping of charge in the polymeric material is low. Unexpectedly, the manufacturing method according to the invention finally leads to a reduction of so-called drift phenomena when using the NLO-active device. Further, there is less risk of electric burnout during poling, resulting in a higher yield of useful product.

The use of a resistor wire for heating the NLO material to obtain permanently poled NLO polymer has an additional advantage if the live electric conductor is also made to function as electrode in generating the electric field with which the hyperpolarizable groups are poled. This combination of functions gives a simpler, more economical manufacturing method and so constitutes a preferred embodiment of the method according to the present invention.

Conceivable embodiments of the method according to the invention will be described in greater detail hereinbelow.

Poling of the NLO polymers in the method according to the invention is by applying an electric field in a known manner. The material to be poled, which is generally deposited on a substrate, is provided with electrodes connected to a rectified voltage feed. Voltages of some tens to several hundreds of volts per $\mu$m of polymer layer thickness are common. The period of exposure to the electric field is generally in the range of a few seconds to several minutes, but may also be from some tens of minutes to one hour, notably when use is made of a thermosetting NLO composition. The period of time required is further dependent on the temperature at which poling takes place. As has been stated above, this temperature is dependent on the NLO polymers used, but it will generally be in the range of from about 50° to about 350° C., more particularly in the range of about 80° to about 200° C. The poling field is maintained as the poled material is cooled down to ambient temperature.

Representative poling temperatures and the appropriate periods of time required are known, for example, from patent publications. Thus, it is known from European Patent Publication No. 378,185 to expose an NLO copolymer described therein at a temperature of 85° C. to an electric field strength of $8 \times 10^5$ V/cm for a period of 20 minutes. An NLO polymer described in U.S. Pat. No. 4,865,406 is exposed for 10 minutes to an electric field strength of 70 V/$\mu$m at a temperature of 90° C. European Patent Publication No. 396,172 describes the alignment of an NLO polymer by means of corona discharge, the temperature being 127° C. In European Patent Publication No. 445,864, in which there is a disclosure of an NLO thermoset, a thermosetting composition is cured and poled over a period of 15 to 45 minutes at a temperature of 145° C. In European Patent Publication No. 359,648 there is poling under the influence of an electric field of 50 V/$\mu$m at a temperature of 100° C., for a few seconds.

It should further be noted that the electric voltage generated by the poling field generally is rectified voltage, but that it has also proved possible, under certain conditions described in the literature, to make use of a.c. voltage, see Paul R. Ashley and Thomas E. Tumolillo, *Opt. Soc. Am.* (1991) *Technical Digest Series*, Volume 8, p. 87.

The thermal energy-generating live electric conductor, the resistor wire, may be a heating element known from the field of thin-film technology, such as Ni/Fe or Ni/Cr. Alternatively, also in view of the above-described preferred embodiment, it is possible to employ, as the electric conductor, those materials which are also known as materials from which electrodes are made. These include noble metals, such as gold, silver, palladium or aluminum, as well as those materials known in the present field of technology as transparent electrodes, for example, indium tin oxide. The action of the resistor wire is based on sending a surge (electric impulse) through the electric conductor. The required intensity of the surge and its duration are partly dependent on the shape of the conductor, since it is important that the quadratic resistance of the live conductor be high enough to generate sufficient heat to give a high enough temperature to the NLO polymer for the poling of the hyperpolarizable groups present. Thermal energy-generating electric conductors are known to the person of ordinary skill in the art who can easily determine which strength of current has to be applied for a conductor of the given shape. In the case of the functions of the electrode and the resistor wire being combined, a surge can be realized in actual practice by, say, employing a feed electrode of relatively large diameter (low current density) followed by a segment of the electrode having a comparatively small diameter. A high current density will then be created in this narrow segment, so that heat is generated.

Alternatively, it is possible to employ a material made up of two metals of different intrinsic resistance, and to vary either the thickness of the different metals or the composition of the material in such a way as to obtain the desired effect of a low current density, namely, low intrinsic resistance upon supply, while a high current density, namely, a comparatively high intrinsic resistance, is displayed at the location where the NLO polymer is poled. By thus varying current densities, it is possible to effect local alignment, as desired, if the aim is to have only sections of the optical waveguide heated sufficiently (and so rendered NLO-active through poling).

The NLO polymer can be contacted with the resistor wire directly, as well as indirectly, depending primarily on the type of waveguide under manufacture. For instance, the waveguide being manufactured may be flat, with the actual active section being formed by a core layer of the NLO polymer which is surrounded by cladding that has a lower index of refraction than the core layer. It is possible to first pole the NLO polymer and then apply the cladding, but forming the waveguiding structure of core layer and cladding before applying the resistor wire is preferred. The core layer of NLO polymer will then be in contact with the live electric conductor via the cladding. Depending on the NLO polymers used, it is also possible to realize a waveguide by creating a channel having a higher index of refraction than the surrounding material in the NLO polymer, for example, by the method set forth in European Patent Publication No. 358,476. While the waveguiding channels can be created after poling, it is more convenient in actual practice to refrain from exposing the NLO material to the electric field until one or more waveguiding channels have been provided, for example, with the aid of UV light.

The step in which the layer of NLO polymer is formed may consist of applying a polymer solution to a suitable substrate, for example, by means of spincoating, followed by evaporating the solvent. Suitable substrates include silicon wafers or plastics laminates, such as those based on epoxy resin which may be reinforced or not. Suitable substrates are known to the person of ordinary skill in the art. Of course, the layer of NLO polymer can also be formed by molding, injection molding, or other known processing techniques. When the layer of NLO polymer is made up of a thermoset, the polymer layer may be formed by curing a thermosetting composition to form a free-standing polymer layer, without the use of a substrate.

Especially when a multi-layer structure composed of a core layer and cladding is manufactured, it is recommended to make use of a substrate. A method of manufacturing such a multi-layer structure, a so-called "optoboard", is described in published Netherlands Patent Application No. 8,701,119.

In a special embodiment of the method according to the present invention, use is made of an electrically conductive substrate, for example, of metal, which is also made to function as the thermal energy-generating live electric conductor.

In addition, the invention relates to a device comprising an optical waveguiding structure comprising at least a layer of an NLO polymer containing poled hyperpolarizable groups, a component for coupling light into the waveguide, and electrodes for electro-optically affecting the coupled light. This device according to the present invention is obtained using a method as described hereinbefore and is characterized in that the live electric conductor also functions as an electrode in electro-optically affecting the coupled light. According to the invention, it is preferred to combine in one electric conductor provided on the waveguiding structure the following three functions electrode during poling, resistor wire for heating during poling, and electrode when applying the NLO-active device. Such a combination of functions is of advantage economically as well as convenient in actual practice.

In the method and device according to the invention use may be made of known NLO polymers. Examples of such NLO polymers include those described in European Patent Publication Nos. 350,112, 350,113, 358,476, 445,864, 378,185, and 359,648. The invention is not restricted to any particular type of NLO polymer. Further, the device according to the invention may comprise all structural characteristics which are conceivable, for example, necessary for an electro-optical device. For research purposes it is typical to employ a coupling prism to this end. Well-known prism coupling techniques are described, for example, in *Applied Physics Letters*, 55 (1989), 616–618. In actual practice, a coupling prism is not very functional and for the coupling of light use will generally be made of a optical fiber or a laser lens.

As an example of a device that can be manufactured with advantage according to the invention a frequency doubler may be mentioned.

Nowadays, because of developments in the field of solid state lasers, it is possible in many optical techniques to employ electromagnetic radiation of which the wavelength falls at the nearby infrared end of the electromagnetic spectrum or even within that region thereof in which there is the presence of visible light (red). However, for many optical applications it is desired to be able to use light of a wave- length which falls within the middle region of the visible light range or at the far removed (blue) end thereof. Examples of applications for which this is particularly desired include optical data storage, optical communication techniques, scanning, and optical medical applications. To provide a light source emitting a single wavelength in the desired region, it is known to pass electromagnetic radiation emitted by an existing light source, for example, a laser having a wavelength in the range of from about 700 to about 1300 nm, through a frequency doubler, which will give a light source emitting a wave-length of half that length, namely, in the range of about 350 to about 650 nm. In such a method, it is known to employ optically non-linear materials as a frequency doubling structure. Frequency doublers are known from, for example, U.S. Pat. Nos. 4,865,406, and 4,971,416, European Patent Publication Nos. 361,602, 355,915, and 254,921, British Patent No. 2,187,566, and *Electronics Letters*, 26 (1990), 2105–2107.

In an NLO frequency doubler the optically non-linear material must be alternatingly poled. Such an alternating structure is needed to prevent light subjected to frequency doubling from being wholly or partially extinguished prior to leaving the frequency doubler. Such extinction is connected with the so-called "coherence length". This is the distance between two spaced apart points, A and B, with the frequency doubled component of the light of the original wavelength travelling through the frequency doubler generated at point B being in counterphase to a frequency doubled component of the original light already generated at point A. To prevent such extinction the periodicity of the alternatingly poled polymeric NLO material should be equal to twice the coherence length as shown, for instance, in U.S. Pat. No. 4,971,416.

According to the invention, alternating alignment is effected by a special mode of the above-described local alignment: first and second resistor wires are applied in such a way that when current is passed through the first resistor wire, sections of the NLO material are alternatingly heated and not heated, and when current is passed through the second resistor wire, those sections are heated which were not heated by the first resistor wire. During the surge through the first resistor wire, the NLO material is subjected to a first electric field, after which it is cooled down, so forming alternatingly poled and unpoled NLO polymer. Next, a surge is passed through the second resistor wire with the application of a second, oppositely directed electric field to thus align the remaining NLO polymer sections while maintaining the poling effected by the first electric field. The result, accordingly, is an alternatingly poled NLO polymer. Preferably, the resistor wire and electrode functions are combined, as described hereinbefore. By providing the two resistor wires about the NLO polymer as interlocking, preferably rectangular meanders the desired alternating pattern can easily be realized.

The previously described embodiments of the present invention should not be taken as limiting the scope of protection desired which is set forth in the claims which follow.

I claim:

1. A method of manufacturing a non-linear optically active (NLO) device, in which method an optical waveguiding structure is formed which comprises at least a layer of an NLO polymer containing hyperpolarizable groups, with the NLO polymer being exposed, with heating, to an electric field for poling of the hyperpolarizable groups wherein the NLO polymer is heated by an electric conductor which is in contact with the NLO polymer and which generates thermal energy for the heating of the NLO polymer.

2. A method according to claim 1 wherein the live electric conductor also functions as an electrode in generating the electric field with which the hyperpolarizable groups are poled.

3. A method according to claim 2 wherein the NLO polymer is surrounded by cladding in forming the optical waveguiding structure.

4. A method according to claim 2 wherein the optical waveguiding structure is provided on a substrate.

5. A method according to claim 2 wherein a frequency doubler is manufactured by effecting alternating alignment in the NLO polymer, with alternating sections of the NLO polymer being contacted with first and second thermal energy generating live electric conductors, with a first electric field being applied during heating with the first live conductor, and, after cooling down of the thus poled polymer sections, a second, oppositely directed electric field being applied during heating with the second live conductor.

6. A method according to claim 1 wherein the NLO polymer is surrounded by cladding in forming the optical waveguiding structure.

7. A method according to claim 6 wherein the optical waveguiding structure is provided on a substrate.

8. A method according to claim 1 wherein the optical waveguiding structure is provided on a substrate.

9. A method according to claim 8 wherein the substrate is, electrically conducting and is also given the function of a thermal energy generating live electric conductor.

10. A method according to claim 1 wherein a frequency doubler is manufactured by effecting alternating alignment in the NLO polymer, with alternating sections of the NLO polymer being contacted with first and second thermal energy generating live electric conductors, with a first electric field being applied during heating with the first live conductor, and, after cooling down of the thus poled polymer sections, a second, oppositely directed electric field being applied during heating with the second live conductor.

11. A device comprising an optical waveguiding structure comprising at least a layer of an NLO polymer containing poled hyperpolarizable groups, a component for coupling light into the waveguiding structure, and electrodes for electro-optically affecting the coupled light wherein the device is manufactured using a method according to claim 1 with the live electric conductor also functioning as an electrode in electro-optically affecting the coupled light.

12. A device comprising an optical waveguiding structure comprising at least a layer of an NLO polymer containing poled hyperpolarizable groups, a component for coupling light into the waveguiding structure, and electrodes for electro-optically affecting the coupled light wherein the device is manufactured using a method according to claim 2 with the live electric conductor also functioning as an electrode in electro-optically affecting the coupled light.

13. A device comprising an optical waveguiding structure comprising at least a layer of an NLO polymer containing poled hyperpolarizable groups, a component for coupling light into the waveguiding structure, and electrodes for electro-optically affecting the coupled light wherein the device is manufactured using a method according to claim 8 with the live electric conductor also functioning as an electrode in electro-optically affecting the coupled light.

* * * * *